UNITED STATES PATENT OFFICE.

LEON LILIENFELD, OF VIENNA, AUSTRIA-HUNGARY.

ALKYL ETHERS OF CELLULOSE AND PROCESS OF MAKING THE SAME.

1,188,376.  Specification of Letters Patent.  Patented June 20, 1916.

No Drawing.  Application filed June 26, 1912. Serial No. 706,009.

*To all whom it may concern:*

Be it known that I, Dr. LEON LILIENFELD, a subject of the Emperor of Austria-Hungary, residing at No. 1 Zeltgasse, Vienna, VIII, Austria-Hungary, have invented new and useful Alkyl Ethers of Cellulose and Process of Making the Same, of which the following is a specification.

The present invention relates to the manufacture of new cellulose derivatives which are chemically alkyl ethers of cellulose that is, compounds of cellulose or of its allied "conversion products" such as cellulose hydrate, oxy-cellulose and the like, in which one, several or all of the hydrogen atoms of the hydroxyl groups of the cellulose are replaced by alkyl radicals or, in other words, in which cellulose has been partly or wholly alkylated. This hitherto unknown group of bodies comprises a large number of members which differ one from the other in their properties according to the nature and number of the alkyl radicals which are substituted for the hydrogen atoms of the hydroxyl groups of the cellulose. They all have in common a high degree of stability and neutrality, which combined with favorable solubilities and very valuable physical properties, render the said bodies suitable for a very great variety of uses.

The process consists in first treating cellulose or its conversion products or derivatives with suitable alkylating agents and thus substituting the corresponding alkyl radicals for one, several or all of the hydrogen atoms of the hydroxyl groups of the cellulose, and secondly isolating the formed alkyl ethers of cellulose from the reaction mixture.

The following raw or primary materials may be employed:

1. Bleached or unbleached cellulose in any form.
2. Substances or materials containing cellulose, for instance, wood, pulp, cotton, flax, hemp, jute, straw, esparto, rice husks, vegetable pith and the like.
3. Conversion-products allied to cellulose, for instance hydrolyzed and oxidized celluloses (such as cellulose hydrate, cellulose, acid-cellulose, sulfhydro-cellulose, colloidal cellulose, oxy-cellulose, celloxin and the like), which are obtained by treating cellulose, or materials containing cellulose, with peroxids, perborates, persulfates, percarbonates, permanganates, chromic acid, bichromates, nitric acid, chlorid of lime, hypochlorites and hypobromites, chlorates in acid solution, chlorin and bromin alone or in the presence of inorganic or organic acids, sulfur chlorid, oxygen, ozone, cuprammonium solution, ammoniacal cuprous oxid solution, zinc chlorid and other zinc halids, organic and inorganic acids, alkalis in the cold or with the aid of heat, &c. To this third class belong the cellulose derivatives that are soluble in aqueous solutions of alkalis and are very suitable for the present process, in the form in which they are obtained by treating cellulose with hot alkaline liquors (with or without subsequent precipitation by means of acids, alcohols and the like), with cuprammonium solution and subsequent precipitation by suitable precipitants, such as acids, alkalis, salts and the like, with zinc halids alone or in conjunction with acids and subsequent precipitation, with strong sulfuric acid (*e. g.* 45 to 60° Bé.) and subsequent precipitation by dilution with water. For this purpose there may also be used the cellulose conversion products soluble in solutions of alkalis which are produced by the action of saponifying agents upon their esters (cellulose nitrates, cellulose acetates, cellulose formates and the like) and those which are produced by treating raw or refined cellulose xanthogenates (viscose) with acids, metallic salts, acids and salts, heat, spontaneous coagulation, and the like. The cellulose xanthogenates are also suitable in whatever form they occur. Artificial silks and artificial silk waste of all kinds (for instance nitro-cellulose silk, viscose silk, silk obtained from cellulose dissolved in cuprammonium solution, acetyl-cellulose silk, formyl-cellulose silk, &c) may therefore also be used in the new process.

4. All inorganic and organic simple and mixed esters of cellulose, for instance, nitrocelluloses, acetyl-celluloses, formyl-celluloses, lactyl-celluloses, cellulose phosphates, formyl-cellulose phosphates and the like. If basic substances are present in the reaction mixture, then in most cases a saponification of the hereinbefore mentioned esters will take place. The resulting salts of the acid components of the esters have no pronounced unfavorable influence on the reaction. Consequently the cellulose or cellulose-hydrate which is liberated at the same time reacts exactly in the same manner, and produces exactly the same alkali ethers as ordinary cellulose or cellulose-hydrate. In case of the saponification of the cellulose-esters not being complete, the final product will be an alkyl ether of cellulose which may contain also ester groups.

The expression "cellulosic" substance in the specification as well as in the claims means those bodies referred to in the foregoing paragraphs 1, 2, 3 and 4.

The process may be carried out for instance by first treating cellulose or its conversion products or derivatives of cellulose with basic substances and inorganic alkyl esters and secondly isolating the formed alkyl ethers of cellulose from the reaction mixture. Alkyl halids, sulfuric acid esters, alkyl sulfates, etc., in short, suitable inorganic alkyl esters generally may be caused to act upon cellulosic substances such as cellulose or its derivatives or conversion products. If the alkali compounds of cellulose (mercerized cellulose) cellulose-hydrate, oxy-cellulose, cellulose-xanthogenates or the like, or other existing metallic compounds of cellulose are employed as primary materials, then the basic substances are fixed to the cellulose bodies. In all other cases the basic substances are introduced in a free state into the reaction mass. The process may, however, be carried out by adding to the reaction mixtures a further quantity of free basic substances, for instance alkalis, alkali-alcoholates and the like, in addition to the basic substances fixed to the cellulose bodies. The desired amount of basic substances may be added to the reaction mixtures either all at once at the beginning or gradually during the reaction. They may be added in the undissolved state, or dissolved in suitable solvents.

The process may also be carried out in the presence of basic substances in excess, and the excess of basic substances (especially if caustic alkalis) may also act as condensing or dehydrating agents.

The cellulosic substances such as cellulose, cellulose derivatives or cellulose conversion products, may be employed dissolved in suitable solvents, or undissolved. For instance, if the primary materials employed are the cellulose-hydrates, oxy-celluloses, cellulose xanthogenates, colloidal celluloses and the like or their metallic compounds, which are soluble in water or in aqueous alkalis, ammonia and the like, the reaction may be effected in an aqueous or aqueous-alkaline or aqueous-alcoholic solution. Or the operations may be begun with an aqueous-alkaline solution, and an organic solvent or diluent, for instance an alcohol, hydrocarbons, pyridin or the like may be added during the reaction either in one portion or in several portions. These solvents or diluents (for instance alcohol) may also be employed for dissolving the basic substances (for instance, an alkali metal hydroxid, alkali-metal, alkali-alcoholate, ammonia, pyridin and the like). When the primary materials employed are cellulose derivatives (for instance cellulose esters and the like) soluble in organic solvents, they may be dissolved in organic solvents such as alcohol, pyridin and the like, and thus brought into the reaction.

The process may also be commenced with undissolved cellulosic substances especially in cases where one has to deal with insoluble cellulosic substances such as cellulose, alkali-cellulose, alkali-insoluble cellulose-hydrate, alkali-insoluble oxy-cellulose and the like.

In all cases, in working with dissolved or with undissolved cellulosic substances, the reaction may be carried out in the presence or in the absence of diluents or of solvents for the resulting alkyl ethers of cellulose (for instance, alcohol, benzene, pyridin and the like). When for instance pyridin or similar bases are employed as solvents or diluents, they may also act as basic substances. The inorganic alkyl esters may be added either at once or gradually to the reaction mixtures. The reaction may take place in an open vessel or in a vessel provided with a reflux condenser or under pressure (for instance in digesters, autoclaves, pressure tubes and the like) or in a partial vacuum, or with exclusion of air by means of neutral gases. In most cases the alkyl ethers of cellulose may be preferably separated out from aqueous reaction mixtures by bringing the hot or warm reaction masses either directly or after dilution with water, or when necessary after previous neutralization or acidification, on to filters, filter presses, suction apparatus, percolating cloths, centrifugal apparatus, rotary filters or the like, and washing the precipitates thoroughly with hot water. If the resulting alkyl ethers of cellulose are also insoluble in cold water they may be freed by means of cold water from the by-products of the reaction. If the resulting alkyl ethers of cellulose are contained in the dissolved state in the reaction mixture, as would be the case when the reaction has taken place in the presence of a solvent, they can be precipitated by the addition of hot or cold water or aqueous solutions of salts. In all cases they can be removed from the reaction mixtures by a suitable extracting agent in which they are soluble and the by-products of the reaction are insoluble. They can then be obtained either by precipitation by suitable precipitants, or by driving off the solvent. If necessary the alkyl ethers of cellulose may further be subjected to a purifying process, conveniently by redissolving them in a suitable solvent and then precipitating by means of a suitable precipitant or by dialysis or by distilling off said solvent or the like.

Since as is well known, cellulose contains several alcoholic hydroxyl-hydrogens the new process permits of varying from the beginning the number of the hydrogen atoms of the hydroxyl groups of the cellulose that are replaced by alkyl radicals. The number of the introduced alkyl radicals depends upon the quantity of the inorganic alkyl esters which is employed and also on the conditions of working (temperature, nature and quantity of the basic substances, concentration of the reaction mixtures, etc.)

Alkyl ethers of cellulose containing several alkyl radicals may also be produced by preparing alkyl ethers with a lower number of alkyl-radicals and thereafter treating them with inorganic alkyl esters.

The free hydroxyl groups of those alkyl ethers of cellulose in which not all of the hydrogen atoms of the hydroxyl groups of the cellulose or of its conversion products are replaced by alkyl radicals, have a natural tendency to form compounds with basic substances and especially with metals, for instance, alkali metals, or their hydroxids. This is shown for instance by the fact that many alcoholic-soluble alkyl ethers of cellulose in which not all of the hydrogen atoms of the hydroxyl groups of the cellulose are replaced by alkyl radicals, yield precipitates when their alcoholic solutions are treated with a solution of an alkali in alcohol. This is due to the fact that although the free alkyl ethers of cellulose are soluble in alcohol, yet their compounds with alkalis are insoluble in alcohol. For this reason in the case of such alkyl ethers of cellulose it is advisable to liberate the hydroxyl group by treating such alkali compounds with acids or acid salts. This may be done either by adding substances having an acid reaction to the reaction mixtures after the completion of the reaction or by separating out the compounds of the alkyl ethers of cellulose with the basic substances and then subjecting them to the action of acids or acid salts.

It appears probable that in many cases mixtures of various alkyl ethers of cellulose are produced instead of a single alkyl ether of cellulose. In these mixtures the substances may differ from each other in that they contain different numbers of alkyl radicals. Mixed alkyl ethers of cellulose are produced by allowing two or more inorganic alkyl esters (differing from one another as regards the alkyl-radicals) to act upon cellulosic substances for example cellulose or its conversion products or derivatives. Such mixed alkyl ethers of cellulose may also be obtained by producing alkyl ethers containing free hydroxyl groups and containing one or more introduced similar alkyl radicals, and then treating them with inorganic alkyl esters containing one or more other alkyl radicals.

The new alkyl ethers of cellulose possess a great variety of properties according to the number and nature of the alkyl radicals linked ether-fashion with the cellulose molecule. Many are soluble in water; (particularly those in which small numbers of hydrogen atoms have been replaced by alkyl radicals); others are insoluble in water but soluble in a number of other solvents.

Many of the water-soluble alkyl ethers of cellulose produced according to this invention have the characteristic feature that although they are soluble in cold water, they are insoluble or difficultly soluble in hot water, so that their aqueous solutions become coagulated or precipitated by heating. Many of the water-insoluble cellulose ethers are soluble in a surprisingly large number of solvents.

According to my researches the alkyl ethers of cellulose have all in common an extremely high degree of stability, neutrality and indifference. They withstand being heated alone or with water and are characterized by the fact that they are not decomposable by aqueous or alcoholic solutions of alkalis. This test readily distinguishes the alkyl ethers of cellulose from the cellulose esters. The alkyl ethers of cellulose possess a greater stability than any of the simple or mixed cellulose esters or any of the hitherto described conversion products or derivatives of cellulose. The alkyl ethers of cellulose yield alkyl iodids on being treated with concentrated hydriodic acid. All alkyl ethers of cellulose have according to my researches further in common that films, coatings, filaments, plastic masses and products generally produced from their solutions or jellies possess a very remarkable degree of suppleness, flexibility, power of resistance to chemical and physical influences, hardness and strength. All these advantages are further accompanied by the property of many alkyl ethers of cellulose of being readily and easily soluble in an almost unlimited number of solvents, which is a property which has not been possessed hitherto, by any conversion product of cellulose or derivative of cellulose. Finally the alkyl ethers of cellulose are distinguished by their uninflammability or only very slight combustibility. All those properties render the alkyl ethers of cellulose suitable for a practically unlimited number of uses. Above all, they are according to my researches, adapted with regard to the above mentioned properties to replace with advantage in the same or similar applications, cellulose and its conversion products and derivatives (cellulose hydrate, oxy-cellulose, viscose, nitro-cellulose, acetyl-cellulose, formyl-cellulose, etc.).

Owing to the very numerous solvents in which the alkyl ethers of cellulose are soluble, these compounds may be combined with a much larger number of softening and gelatinizing agents than has been possible in the case of the cellulose derivatives hitherto known. The great number of solvents available therefore provides also the possibility of combining the alkyl ethers of cellulose with many other colloids and binding substances and plastic bodies with which the hitherto known cellulose derivatives could not be combined. Since the series of solvents, beginning with water, comprises almost all the organic solvents it is possible to combine the various alkyl ethers of cellulose with many water-soluble colloids, binding substances, thickening agents, plastic bodies, drying and non-drying oils, fats, balsams, adhesives, waxes, paraffins, resins, caoutchouc and gutta-percha, etc. They may be worked together with the hitherto known cellulose derivatives, such as viscose, cellulose hydrate, oxy-cellulose, cuprammonium-cellulose, nitro-cellulose, formyl-cellulose, acetyl-cellulose, etc. One and the same solvent (simple or mixed) may be used for said substances and for the corresponding alkyl ethers of cellulose.

It would take too long to enumerate in this specification all the uses for which the cellulose alkyl ethers are suitable. The following uses may be mentioned by way of example:—as plastic masses, celluloid substitutes (alkyl ethers of cellulose, alone or mixed with other cellulose derivatives or mixed with camphor or other gelatinizing agents, or camphor substitutes, or agents for imparting softness or plasticity) artificial filaments and spinning fibers, artificial animal hair, films, all kinds of photographic articles, lacquers, varnishes and paints, insulating goods, dressings for spinning fibers, dressings for fabrics, leather, paper and the like, printing agents and thickening agents for the same, agents for fixing pigments, adhesives, cements and glues and adhesive pastes, size for paper, &c.

The following are examples of the manner in which the process of making alkyl ethers of cellulose may be carried out, but the invention is not limited to these particular examples:

I. (a) 3750 parts by weight of a raw viscose containing about 500 parts by weight of cellulose and about 130 to 200 parts by weight of caustic soda, are diluted with 3750 parts by weight of water, and heated with stirring on the water bath until complete coagulation has taken place. The coagulated mass which has crumbled into small lumps by the stirring, is thoroughly washed in flowing water, crushed, pressed to 5000 parts by weight, and then dissolved in 1000 parts by weight of a caustic soda solution of 50 per cent. strength. The solution may then be freed by filtering or percolation from any particles that have remained undissolved.

(b) Cellulose hydrate is precipitated by dilute sulfuric acid from a solution of cellulose in Schweizer's reagent, and is dissolved in caustic soda solution so that 120 parts of the solution contain 10 parts of cellulose hydrate and 10 parts of caustic soda.

(c) Cellulose is heated with caustic soda solution of 30–50 per cent. strength; the liquor is poured off, and the resulting cellulose hydrate is dissolved by the addition of water and preferably filtered. The solution is precipitated by dilute sulfuric acid or acetic acid, and the precipitated cellulose hydrate (preferably after previous washing) is dissolved in caustic soda solution so that 120 parts of the solution contain 10 parts of cellulose hydrate and 10 parts of caustic soda.

The expression "primary solutions as in Example I," used in several of the following specific examples is intended to refer to the solution as prepared according to either one of the above paragraphs I a, I b, or I c.

1200 parts by weight of the solution resulting from the treatment given under (a), (b) or (c) containing 100 parts by weight of cellulose or of cellulose hydrate, as the case may be, and 100 parts by weight of caustic soda are mixed with 100 to 400 parts by weight of caustic soda solution of 30 per cent. strength, well stirred and gently warmed. To this are then added 200 parts by weight of di-ethyl sulfate in small portions, and the mixture is again heated for a time if required. The turbid reaction mass is diluted with hot water and acidified with dilute sulfuric acid, the resulting ether being thus separated out. It is preferably collected on a hot water funnel and thoroughly washed with hot water. The washed ethyl ether of cellulose is then dried in a vacuum or in air with or without the aid of heat, either immediately or after treatment with alcohol or alcohol and ether, or it is subjected if desired to a purifying process. This purifying process may consist in, for instance, re-dissolving in cold water and precipitation by alcohol, or by heating alone or in the presence of salt solutions. The resulting ethyl ether of cellulose is a white, pulverulent or flaky substance which is readily soluble in cold water, formic acid, cold or hot aqueous acetic acid and aqueous pyridin, but is insoluble in alcohol and in hot water.

II. 1200 parts by weight of one of the primary solutions as in Example I, containing 100 parts by weight of cellulose or cellulose hydrate, and 100 parts by weight of caustic soda, are heated with 100 to 400 parts by weight of caustic soda solution of 30 per cent. strength and mixed gradually with 300 parts by weight of di-ethyl sulfate, whereupon the mixture may be heated again if required. The reaction mass is acidified by stirring, shaking, kneading or rubbing the mass with dilute sulfuric acid, collected on a filtering device and thoroughly washed with hot water. The further treatment is as described in Example I. The resulting ethyl ether of cellulose is a white pulverulent or flaky substance which is readily soluble in cold water, glacial acetic acid, formic acid, pyridin, di-chlorhydrin, ethyl formate and aqueous acetone, but is insoluble in hot water.

III. 1200 parts by weight of one of the primary solutions as in Example I, containing 100 parts by weight of cellulose and 100 parts by weight of caustic soda, are heated with 200 to 400 parts by weight of a caustic soda solution of 30 to 40 per cent. strength, and then 500 parts by weight of di-ethyl sulfate are added gradually, the reaction temperature rises and the cellulose ether separates out. It may either be collected immediately on a filtering device and washed with hot water and then treated with an acid, or the whole reaction mass may be acidified by well stirring, shaking or kneading it with dilute sulfuric acid, then filtered and afterward washed. The final preparation of the ethyl ether is effected as in Example I. Since however this ether is soluble in alcohol, it may be purified by dissolving in alcohol and precipitating by ether, benzene or the like. This ethyl ether of cellulose is a white pulverulent or flaky substance which is readily soluble in cold water, alcohol, methyl-alcohol, glacial acetic acid, formic acid, pyridin, di-chlorhydrin, nitro-benzene, ethyl formate and aqueous acetone, but is insoluble in hot water.

IV. 1200 parts by weight of one of the primary solutions as in Example I, containing 100 parts by weight of cellulose and 100 parts by weight of caustic soda, are mixed with 500 parts by weight of di-ethyl sulfate heated and mixed gradually with 220 parts by weight of caustic soda solution of 30 per cent. strength, or with the equivalent quantity of an alcoholic caustic potash solution of 25 per cent. strength. If necessary the mixture may then be heated. In this case also the treatment may consist in diluting immediately with hot water, filtering, and washing the ethyl ether of cellulose remaining on the filter, and then subjecting it to a subsequent treatment with an acid, or in acidifying the reaction mixture after the end of the reaction with for instance dilute sulfuric acid, when the reaction is complete, filtering and thoroughly washing the precipitate. The final preparation is effected as in Example III. The finished ether is a white pulverulent or flaky substance which is readily soluble in cold water, alcohol, methyl-alcohol, glacial acetic acid, formic acid, pyridin, di-chlorhydrin, nitro-benzene, ethyl formate, aqueous acetone, but is insoluble in hot water.

V. 1200 parts by weight of one of the primary solutions as in Example I, containing 100 parts by weight of cellulose and 100 parts by weight of caustic soda, are mixed with 500 parts by weight of di-ethyl sulfate, heated and gradually mixed with 130 to 220 parts by weight of caustic soda solution of 50 per cent. strength, or the equivalent quantity of a strong alcoholic caustic potash solution. The mass is afterward heated if required. The further treatment is as in Examples III and IV. The resulting ethyl ether of cellulose is a white pulverulent or flaky substance which is readily soluble in cold water, alcohol, methyl-alcohol, glacial acetic acid, formic acid, pyridin, di-chlorhydrin, nitro-benzene, ethyl formate, aqueous acetone, gelatinizes in tetra-chlorethane and is insoluble in hot water.

VI. 1200 parts by weight of one of the primary solutions as in Example I, containing 100 parts by weight of cellulose and 100 parts by weight of caustic soda, are mixed with 110 parts by weight of caustic soda solution of 30 per cent. strength, heated, and then 166.6 parts by weight of di-ethyl sulfate are added. After about half an hour another 110 parts by weight of 30 per cent. caustic soda solution and another 166.6 parts by weight of di-ethyl sulfate are added, and the same additions are again made after the lapse of another half hour, so that the total addition consists of 333 parts by weight of 30 per cent. caustic soda solution and 500 parts by weight of di-ethyl sulfate. The mass is again heated if required and further treated as in Examples III, IV and V. The resulting ethyl ether of cellulose is a white pulverulent or flaky substance which is soluble in cold water, alcohol, methyl-alcohol, formic acid, glacial acetic acid, pyridin, di-chlorhydrin, nitro-benzene, ethyl formate and aqueous acetone, but is insoluble in hot water.

VII. 1200 parts by weight of one of the primary solutions as in Example I, containing 100 parts by weight of cellulose and 100 parts by weight of caustic soda, are mixed with 625 parts by weight of caustic soda solution of 40 per cent. strength, gently heated, and then there are gradually added 600 to 750 parts by weight of di-ethyl sulfate. Immediately after this addition or after a certain lapse of time, 500 parts by weight of 50 per cent. caustic soda solution and 600 to 750 parts by weight of di-ethyl sulfate are added. The separation of the ethyl ether of cellulose is accompanied by a rise in temperature and frothing of the mass. The reaction mixture is preferably after dilution with water, either acidified immediately with dilute sulfuric acid or placed in the alkaline state on a suitable filtering device, and the ethyl ether of cellulose is thoroughly washed with hot or cold water. In the second case it is preferred to effect a subsequent treatment with an acid or with an acid salt, and again washing. The resulting ethyl ether or cellulose is insoluble in either hot or cold water, and may be purified for instance by dissolving in alcohol and filtering, or, without filtering, precipitating it by water or a dilute salt solution, and then again washing. The dry ethyl ether of cellulose, as thus prepared, is a white powder which is insoluble in hot or cold water, but is soluble in alcohol, methyl-alcohol, formic acid, glacial acetic acid, pyridin, di-chlorhydrin, nitro-benzene, aqueous acetone, tetra-chlor-ethane and the like.

VIII. 1200 parts by weight of one of the primary solutions as in Example I, containing 100 parts by weight of cellulose and 100 parts by weight of caustic soda are mixed with 100 parts by weight of a 30 per cent. caustic soda solution, and gently heated, and there are then added gradually 100 to 200 parts by weight of di-ethyl sulfate. The addition takes about say, from half an hour to two hours. The product at this stage of the process consists essentially of cellulose ethers in which a relatively small number of hydroxyl hydrogens have been replaced by alcohol radicals, and the material is somewhat soluble in water, and is more soluble in cold water than in hot. If necessary the mass is afterward heated on the water bath for half an hour to two hours and the reaction mixture, preferably when cold, is rubbed up, stirred or kneaded with 300 to 600 parts by weight of powdered caustic soda or the equivalent quantity of caustic potash. The caustic potash or caustic soda, in the form of a powder, appears to act as a dehydrating agent. Then the mass is again heated and into it are introduced 300 to 1300 parts by weight of di-ethyl sulfate gradually or in several portions at suitable intervals of time, whereupon the separation of the ethyl ether of cellulose takes place accompanied by a rise in temperature and frothing of the mass. The reaction mixture is preferably after dilution with water, either acidified immediately with dilute sulfuric acid, or is placed in the alkaline state upon a suitable filtering device, and the cellulose ether collected on the filtering device is thoroughly washed with hot or cold water. In the second case it is preferred to effect a subsequent treatment with an acid or an acid salt and again washing.

Since those conversion products or derivatives of cellulose which are soluble in aqueous solutions of alkalis are separated out or precipitated when adding a larger quantity of caustic alkali and more especially on heating, the operation in the Examples VII and VIII is, as will be seen, carried out in such a manner that I add first only part of the amount of caustic soda and of the ethyl sulfate which would be necessary to obtain the insoluble ethyl cellulose or ethyl cellulose hydrate so that I obtain first a water soluble ethyl cellulose; thereafter I add to the reaction mixture containing the water soluble ethyl cellulose a further quantity of caustic soda and ethyl sulfate, thus transforming the water soluble ethyl ether of cellulose into an insoluble ethyl ether. It is evident that the reaction between the alkyl-sulfate and the alkali hydroxid may also be carried out by adding the one and the other in a greater number of portions, alternating in such a manner that each addition of a small portion of alkali hydroxid is followed by the addition of a small portion of ethyl sulfate. It is, of course, clear that the water soluble ether may be separated out and treated after separation with a further quantity of an alkali and of ethyl sulfate in order to convert it into an insoluble ether. Since the final ethyl ether of cellulose is insoluble in water, it may be purified, say, by dissolving in alcohol and then with or without filtration, precipitating by water or a dilute salt solution, and again washing. The resulting ethyl ether of cellulose is a white powder which is insoluble in hot or cold water but is readily soluble in the following solvents:—alcohol, methyl-alcohol, glacial acetic acid, formic acid, pyridin, quinolin, picolin, dichlorhydrin, epi-chlorhydrin and the like, nitro-benzene, methyl-acetate, acetic ether, ethyl phthalate, ethyl sebacate, ethyl citrate, ethyl succinate, ethyl tartrate, amyl-acetate, butyl-acetate, ethyl benzoate, ethyl levulinate and the like, acetone, pentachlorethane, tetrachlorethane, trichlorethane, acetylene di-chlorid, carbon tetrachlorid, chloroform and the like, benzene, toluene, xylene, phenol, nitrophenols, ortho-cresol and the like, naphthalene, toluidin, anilin and the like, formanilid, acetanilid and the like, turpentine oil, camphor, castor oil, linseed oil, Chinese wood oil, olive oil and the like, vaseline oil, paraffin oil, naphtha (petroleum), vaseline and the like, stearin, beeswax, Japan wax, lanolin and the like, nitro-methane, phenyl ether, triphenyl phosphate, tri-cresyl phosphate, etc. It is also readily soluble in a mixture of ethyl-alcohol and ether, and also in ethyl ether alone, but not so readily in the latter. It can withstand being heated for days in digesters in the presence of water at high temperatures, such as for instance 170 degrees C. without showing any alteration. It can be heated for several days with 25 per cent. aqueous caustic soda solution and also with 25 per cent. alcoholic caustic potash solution without undergoing decomposition or change. The combustion of a purified sample of a particular product, made in accordance with this example, dried at 105 degrees C., until its weight remained uniform and containing 0.19 per cent. of ash, gave the following results:—

(a) 0.1970 grams of the sample (calculated for matter free from ash) gave 0.1562 gms. $H_2O = 8.80$ p. c. of H and 0.4094 gms. $CO_2 = 56.67$ per cent. of C.

(b) 0.2134 gms. of the sample (calculated for matter free from ash) gave 0.1719 gms. $H_2O = 8.95$ p. c. of H, and 0.4422 gms. $CO_2 = 56.51$ p. c. of C.

Calculated for $n.C_{22}H_{40}O_{10} = n.C_{12}H_{15}O_{10}.(C_2H_5)_5$:
56.89 p. c. of C, 8.62 p. c. of H.

From the ultimate analysis, the new substance would appear to be a penta-ethyl-ether of cellulose. The invention is not however, limited to this particular example, since various other products can be made, in accordance with the present invention, which do not have this analysis.

IX. 1200 parts by weight of one of the primary solutions as in Example I, containing 100 parts by weight of cellulose and 100 parts by weight of caustic soda, are mixed with 520 to 800 parts by weight of a 30 per cent. caustic soda solution and 1000 parts by weight of ethyl iodid, and heated for some hours to 100 degrees C. in a digester. The result is a somewhat viscid liquid in which is suspended a precipitate partly in the form of flakes and partly in the form of films. The precipitate is collected on a filter, thoroughly washed with hot water, then rubbed up with 10 per cent. sulfuric acid, and again thoroughly washed. For the purpose of purification it may be further dissolved in alcohol, then precipitated by water or a dilute salt solution, again washed and dried. The resulting ethyl-ether of cellulose is a white powder which is insoluble in hot or cold water, but is readily soluble in alcohol, methyl-alcohol, dichlorhydrin, formic acid, glacial acetic acid, nitro-benzene, aqueous acetone, carbon tetrachlorid and the like.

X. 1200 parts by weight of one of the primary solutions as in Example I, containing 100 parts by weight of cellulose and 100 parts by weight of caustic soda, are heated with 520 to 600 parts by weight of a 30 per cent. caustic soda solution with reflux-cooling, and then 1000 parts by weight of ethyl-iodid are added all at once or in several portions. After protracted heating the ethyl-ether of cellulose separates out and is then treated further as in Example IX, its properties being identical with those of the ethyl-ether produced according to Example IX. Working with other ethyl-halids, for instance ethyl-bromid and ethyl-chlorid is similar; their low boiling points having however to be taken into consideration.

Instead of using the cellulose hydrate mentioned in the foregoing examples the same result may be obtained by treating any other cellulose hydrate or oxy-cellulose.

XI. 750 parts by weight of a soda-cellulose (prepared by impregnating cellulose with strong caustic soda solution, squeezing, and then triturating) containing 250 parts by weight of cellulose and 250 parts by weight of caustic soda, are rubbed up with 310 parts by weight of a 10 per cent. caustic soda solution and mixed and heated with 1000 to 2500 parts by weight of di-ethyl sulfate. After the completion of the reaction, which takes place with frothing, the reaction mixture is placed on a filter and the ether remaining on the filter is washed with hot water. The separated ether may be purified by dissolving it in alcohol and precipitating it by ether, benzene or the like. It is a white powder which is soluble in cold water, alcohol, methyl-alcohol, glacial acetic acid, formic acid, pyridin, nitro-benzene, and aqueous acetone; it gelatinizes in tetrachlorethane, and is insoluble in hot water.

Ethyl ethers of cellulose which are insoluble in cold water and are readily soluble in volatile solvents may be produced from alkali-cellulose by varying the conditions of working.

XII. 1200 parts by weight of one of the primary solutions as in Example I, containing 100 parts by weight of cellulose and 100 parts by weight of caustic soda, are mixed with 100 parts by weight of a 30 per cent. caustic soda solution and gently heated, and then 200 parts by weight of di-ethyl sulfate are introduced gradually. After this addition, and if necessary after again heating, the mixture is rubbed up with 300 to 600 parts by weight of powdered caustic soda, the reaction mixture is again heated and to it are then added 200 parts by weight of potassium ethyl sulfate or the equivalent quantity of sodium ethyl sulfate in small portions at a time. The further treatment is as in the foregoing examples.

Di-methyl-sulfate, methyl-halids and methyl-sulfate salts may be used instead of di-ethyl-sulfate or the ethyl-halids and ethyl-sulfate salts; the manner of working being more or less the same. The resulting methyl-ethers however differ in their properties from the hereinbefore described ethyl-ethers of cellulose.

It is to be understood, that although the examples given above relate specifically to the production of ethyl ethers of cellulose, the invention is not limited thereto, since other alkyl radicals may be substituted instead of the ethyl group. I also call attention to the fact that the term "cellulose ethers" has heretofore been incorrectly applied, to cellulose esters, such as cellulose acetate and cellulose nitrate, but I desire to call attention to the fact that the term "cellulose ether" as used in this specification, and in the claims hereto annexed is not intended to apply to esters, but to ethers, that is to say bodies derived from alcohols, by the substitution of an alkyl radical, in place of a hydroxyl hydrogen atom.

Mixtures including cellulose ethers and softening agents or agents capable of increasing the plasticity or other conditioning agents, are not specifically claimed herein, although included within the scope of certain of the claims. Such mixtures are specifically claimed in my copending applications as follows:—754333 filed March 14, 1913 and 796248 and 796249 filed October 20, 1913.

Having now described my invention what I claim as new and desire to secure by Letters Patent is:

1. The process of manufacturing new cellulose derivatives, which are chemically alkyl ethers of cellulose which process consists in first treating cellulosic substances with suitable alkylating agents and secondly isolating the formed alkyl ethers of cellulose from the reaction mixture, substantially as described.

2. The process of manufacturing new cellulose derivatives which are chemically alkyl ethers of cellulose which process consists in first treating cellulose derivatives which are soluble in a solution of an alkali with suitable alkylating agents and secondly isolating the formed alkyl ethers of cellulose from the reaction mixture, substantially as described.

3. The process of manufacturing new cellulose derivatives which are chemically alkyl ethers of cellulose which process consists in first treating alkaline solutions of cellulose derivatives which are soluble in a solution of an alkali with suitable alkylating agents and secondly isolating the formed alkyl ethers of cellulose from the reaction mixture, substantially as described.

4. The process of manufacturing new cellulose derivatives which are chemically alkyl ethers of cellulose which process consists in first treating a cellulosic substance with basic substances and inorganic alkyl esters and secondly isolating the formed alkyl ethers of cellulose from the reaction mixture, substantially as described.

5. The process of manufacturing new cellulose derivatives which are chemically alkyl ethers of cellulose which process consists in first treating cellulosic substances with alkalis and inorganic alkyl esters and secondly isolating the formed alkyl ethers of cellulose from the reaction mixture, substantially as described.

6. The process of manufacturing new cellulose derivatives which are chemically alkyl ethers of cellulose which process consists in first treating cellulosic substances with alkalis and alkyl sulfates and secondly isolating the formed alkyl ethers of cellulose from the reaction mixture, substantially as described.

7. The process of manufacturing new cellulose derivatives which are chemically alkyl ethers of cellulose which process consists in first treating cellulose derivatives which are soluble in a solution of an alkali with basic substances and inorganic alkyl esters and secondly isolating the formed alkyl ethers of cellulose from the reaction mixture, substantially as described.

8. The process of manufacturing new cellulose derivatives which are chemically alkyl ethers of cellulose which process consists in first treating cellulose derivatives which are soluble in a solution of an alkali with alkalis and inorganic alkyl esters and secondly isolating the formed alkyl ethers of cellulose from the reaction mixture, substantially as described.

9. The process of manufacturing new cellulose derivatives which are chemically alkyl ethers of cellulose which process consists in first treating cellulose derivatives which are soluble in a solution of an alkali with alkalis and alkyl sulfates and secondly isolating the formed alkyl ethers of cellulose from the reaction mixture, substantially as described.

10. The process of manufacturing new cellulose derivatives which are chemically alkyl ethers of cellulose which process consists in first treating alkaline solutions of cellulose derivatives which are soluble in a solution of an alkali with inorganic alkyl esters and secondly isolating the formed alkyl ethers of cellulose from the reaction mixture, substantially as described.

11. The process of manufacturing new cellulose derivatives which are chemically alkyl ethers of cellulose which process consists in first treating alkaline solutions of cellulose derivatives which are soluble in a solution of an alkali with alkalis and inorganic alkyl esters and secondly isolating the formed alkyl ethers of cellulose from the reaction mixture, substantially as described.

12. The process of manufacturing new cellulose derivatives which are chemically alkyl ethers of cellulose which process consists in first treating alkaline solutions of cellulose derivatives which are soluble in a solution of an alkali with alkyl sulfates and secondly isolating the formed alkyl ethers of cellulose from the reaction mixture, substantially as described.

13. The process of manufacturing new cellulose derivatives which are chemically alkyl ethers of cellulose which process consists in first treating alkaline solutions of cellulose derivatives which are soluble in a solution of an alkali with alkalis and alkyl sulfates and secondly isolating the formed alkyl ethers of cellulose from the reaction mixture, substantially as described.

14. The process of manufacturing new cellulose derivatives which are chemically alkyl ethers of cellulose which process consists in first treating alkaline solutions of cellulose derivatives which are soluble in a solution of an alkali with alkyl esters and secondly isolating the formed alkyl ethers of cellulose from the reaction mixture, substantially as described.

15. As new products, alkyl ethers of cellulose.

16. The process of manufacturing new cellulose derivatives which are chemically ethyl ethers of cellulose which process consists in first treating cellulosic substances with ethylating agents and secondly isolating the formed ethyl ethers of cellulose from the reaction mixture, substantially as described.

17. The process of manufacturing new cellulose derivatives which are chemically ethyl ethers of cellulose which process consists in first treating cellulose derivatives which are soluble in a solution of an alkali with ethylating agents and secondly isolating the formed ethyl ethers of cellulose from the reaction mixture, substantially as described.

18. The process of manufacturing new cellulose derivatives which are chemically ethyl ethers of cellulose which process consists in first treating alkaline solutions of cellulose derivatives which are soluble in a solution of an alkali with suitable ethylating agents and secondly isolating the formed ethyl ethers of cellulose from the reaction mixture, substantially as described.

19. The process of manufacturing new cellulose derivatives which are chemically ethyl ethers of cellulose which process consists in first treating cellulosic substances with basic substances and inorganic ethyl esters and secondly isolating the formed ethyl ethers of cellulose from the reaction mixture, substantially as described.

20. The process of manufacturing new cellulose derivatives which are chemically ethyl ethers of cellulose which process consists in first treating a cellulosic substance with a basic substance and with only a portion of the quantity of an inorganic ethyl ester which would be necessary to form a water-insoluble ethyl ether of cellulose thus forming a water-soluble ethyl ether of cellulose, secondly treating the reaction mixture containing the water-soluble ethyl ether of cellulose with a further quantity of a basic substance and with a further quantity of an inorganic ethyl ester to convert the ethyl ether of cellulose soluble in water into an ethyl ether of cellulose insoluble in water and finally isolating the formed ethyl ether of cellulose from the reaction mixture, substantially as described.

21. The process of manufacturing new cellulose derivatives which are chemically ethyl ethers of cellulose which process consists in first treating cellulosic substances with alkalis and inorganic ethyl esters and secondly isolating the formed ethyl ethers of cellulose from the reaction mixture, substantially as described.

22. The process of manufacturing new cellulose derivatives which are chemically alkyl ethers of cellulose which process consists in first treating cellulosic substances with an alkali and with only a portion of the quantity of an inorganic alkyl ester which would be necessary to form a water-insoluble alkyl ether of cellulose, thus forming a water-soluble alkyl ether of cellulose, secondly treating the reaction mixture containing the water-soluble alkyl ether of cellulose with a further quantity of an alkali and with a further quantity of an inorganic alkyl ester to convert the alkyl ether of cellulose soluble in water into an alkyl ether of cellulose insoluble in water and finally isolating the formed alkyl ether of cellulose from the reaction mixture, substantially as described.

23. The process of manufacturing new cellulose derivatives which are chemically ethyl ethers of cellulose which process consists in first treating cellulosic substances with alkalis and ethyl sulfate and secondly isolating the formed ethyl ethers of cellulose from the reaction mixture, substantially as described.

24. The process of manufacturing new cellulose derivatives which are chemically ethyl ethers of cellulose which process consists in first treating cellulose derivatives which are soluble in a solution of an alkali with alkalis and inorganic ethyl esters and secondly isolating the formed ethyl ethers of cellulose from the reaction mixture, substantially as described.

25. The process of manufacturing new cellulose derivatives which are chemically ethyl ethers of cellulose which process consists in first treating cellulose derivatives which are soluble in a solution of an alkali with alkalis and ethyl sulfate and secondly isolating the formed ethyl ethers of cellulose from the reaction mixture, substantially as described.

26. The process of manufacturing new cellulose derivatives which are chemically ethyl ethers of cellulose which process consists in first treating alkaline solutions of cellulose derivatives which are soluble in a solution of an alkali with inorganic ethyl esters and secondly isolating the formed ethyl ethers of cellulose from the reaction mixture, substantially as described.

27. The process of manufacturing new cellulose derivatives which are chemically ethyl ethers of cellulose which process consists in first treating alkaline solutions of cellulose derivatives which are soluble in a solution of an alkali with alkalis and inorganic ethyl esters and secondly isolating the formed ethyl ethers of cellulose from the reaction mixture, substantially as described.

28. The process of manufacturing new cellulose derivatives which are chemically ethyl ethers of cellulose which process consists in first treating alkaline solutions of cellulose derivatives which are soluble in a solution of an alkali with ethyl sulfate and secondly isolating the formed ethyl ethers of cellulose from the reaction mixture, substantially as described.

29. The process of manufacturing new cellulose derivatives which are chemically ethyl ethers of cellulose which process consists in first treating alkaline solutions of cellulose derivatives which are soluble in a solution of an alkali with alkalis and ethyl sulfate and secondly isolating the formed ethyl ethers of cellulose from the reaction mixture, substantially as described.

30. The process of manufacturing new cellulose derivatives which are chemically ethyl ethers of cellulose which process consists in first treating an alkaline solution of a derivative of cellulose which is soluble in a solution of an alkali with only a portion of the quantity of ethyl sulfate which would be necessary to form a water insoluble ethyl ether of cellulose, thus forming a water-soluble ethyl ether of cellulose, secondly treating the reaction mixture containing the water soluble ethyl ether of cellulose with a further quantity of a basic substance by adding caustic alkali and with a further quantity of ethyl sulfate to convert the ethyl ether of cellulose soluble in water into an ethyl ether of cellulose insoluble in water and finally isolating the formed ethyl ether of cellulose from the reaction mixture, substantially as described.

31. The process of manufacturing new cellulose derivatives which are chemically alkyl ethers of cellulose which process consists in first treating an alkaline solution of a derivative of cellulose which is soluble in a solution of an alkali with only a portion of the quantity of alkyl sulfate which would be necessary to form a water-insoluble alkyl ether of cellulose thus forming a water-soluble alkyl ether of cellulose, secondly treating the reaction mixture containing the water-soluble alkyl ether of cellulose with a further quantity of a basic substance by adding caustic alkali in solid form and with a further quantity of alkyl sulfate to convert the alkyl ether of cellulose soluble in water into an alkyl ether of cellulose insoluble in water and finally isolating the formed alkyl ether of cellulose from the reaction mixture, substantially as described.

32. As new products, ethyl ethers of cellulose.

33. As new products, such ethyl ethers of cellulose as are practically insoluble in hot water but soluble in organic solvents.

34. As new products, ethyl ethers of cellulose which are soluble in cold water.

35. As new products, alkyl ethers of cellulose in the form of plastic celluloid-like masses and films which may be obtained by evaporating the solutions of the said alkyl ethers of cellulose.

36. As new products, ethyl ethers of cellulose in the form of plastic celluloid-like masses and films which may be obtained by evaporating the solutions of the said ethyl ethers of cellulose.

37. As new products, ethyl ethers of cellulose which are soluble in organic solvents but practically insoluble in hot water in the form of plastic celluloid-like masses and films which may be obtained by evaporating the solutions of the said ethyl ethers of cellulose.

38. As new products, alkyl ethers of cellulose in solid form.

39. As new products, alkyl ethers of cellulose, having at least a portion of the hydroxyl hydrogens of the cellulose, replaced by alkyl radicals each containing a plurality of carbon atoms.

40. As new products, alkyl ethers of cellulose which are insoluble in hot water.

41. The process of manufacturing new cellulose derivatives which are chemically alkyl ethers of cellulose, which process comprises first treating a cellulosic substance with an alkali and an ester of an inorganic acid and an alkyl-alcohol containing a plurality of carbon atoms, and thereafter isolating the alkyl ether of cellulose from the reaction mixture.

42. As a new material, a solid product, containing as its essential constituent, alkyl ethers of cellulose.

43. As new products, ethyl ethers of cellulose which are practically insoluble in water, but soluble in organic solvents.

44. As new products, ethyl ethers of cellulose which are soluble in organic solvents, but practically insoluble in water, in the form of plastic celluloid-like masses and films, which may be obtained by evaporating the solution of the said ethyl ethers of cellulose.

45. A film comprising as an ingredient thereof, a cellulose ether.

46. A water-insoluble film comprising as an ingredient thereof, an ethyl ether of cellulose.

47. A film composed of material containing an alkyl ether of cellulose which is practically insoluble in water, but soluble in some organic solvents.

48. The herein described new plastic substance containing as its essential constituent, a cellulose ether, that is a cellulose derivative in which at least one of the hydrogen atoms of the hydroxyl groups of the cellulose is replaced by an alkyl radical.

49. The herein described new plastic substance containing as its essential constituent, a cellulose ether soluble in some organic solvents.

50. The herein described new plastic substance containing as its essential constituent a cellulose ether insoluble in water but soluble in some organic solvents.

51. Films, more particularly for photographic purposes, characterized by containing ethers of cellulosic substances that is to say compounds of cellulosic substances in which at least one of the hydroxyl-hydrogens of the cellulose molecule, is replaced by an alkyl radical substantially as described.

In testimony whereof I have signed my name to this specification in the presence of two subscribing witnesses.

Dr. LEON LILIENFELD.

Witnesses:
 Herman Wunderlich,
 August Fugger.